(12) United States Patent
Carretta et al.

(10) Patent No.: US 9,573,180 B2
(45) Date of Patent: Feb. 21, 2017

(54) METHOD AND APPARATUS FOR FABRICATING A METAL PIPE HAVING AT LEAST ONE SMOOTH PORTION AND AT LEAST ONE GROOVED PORTION

(71) Applicants: Lucio Carretta, Longare (IT); Fabio Pedrini, Casalecchio di Reno (IT)

(72) Inventors: Lucio Carretta, Longare (IT); Fabio Pedrini, Casalecchio di Reno (IT)

(*) Notice: Subject to any disclaimer, the term of this patent is extended or adjusted under 35 U.S.C. 154(b) by 915 days.

(21) Appl. No.: 13/915,219

(22) Filed: Jun. 11, 2013

(65) Prior Publication Data

US 2013/0340880 A1    Dec. 26, 2013

(30) Foreign Application Priority Data

Jun. 22, 2012 (IT) ................ TO2012A0551

(51) Int. Cl.
*B21C 37/15* (2006.01)
*B21D 15/02* (2006.01)
*F16L 9/02* (2006.01)

(52) U.S. Cl.
CPC ............ *B21C 37/156* (2013.01); *B21D 15/02* (2013.01); *F16L 9/02* (2013.01)

(58) Field of Classification Search
CPC ......... B21D 13/02; B21D 13/08; B21D 17/02; B21D 17/025; B21D 17/04; B21D 19/04; B21D 19/08; B21D 24/005; B21D 41/02; B21D 41/025; B21D 15/02; F16L 9/02; F16L 9/06; F16L 9/006; B21C 37/15; B21C 37/156; B21C 37/158; B21C 37/16
See application file for complete search history.

(56) References Cited

U.S. PATENT DOCUMENTS

| | | | |
|---|---|---|---|
| 629,245 A | 7/1899 | Frank | |
| 1,670,532 A * | 5/1928 | Crawford | B21D 41/025 29/520 |
| 3,407,638 A * | 10/1968 | Greis | B21D 15/02 72/370.2 |
| 3,417,598 A * | 12/1968 | Valente | B21C 5/00 72/383 |

(Continued)

FOREIGN PATENT DOCUMENTS

| | | |
|---|---|---|
| FR | 2575007 A1 | 6/1986 |
| GB | 113158 A | 7/1899 |
| WO | 8000066 A1 | 1/1980 |

*Primary Examiner* — Moshe Wilensky
*Assistant Examiner* — Pradeep C Battula
(74) *Attorney, Agent, or Firm* — Boyle Fredrickson, S.C.

(57) ABSTRACT

A metal pipe having at least one smooth portion and at least one grooved portion is obtained by progressive deformation of its wall in at least two consecutive phases. Each phase is carried out using a tool assembly including a grooved female die that accommodates the portion of pipe being deformed, and a grooved male punch that moves axially in order to give the pipe a cross section with an undulating profile, defining longitudinal ribs distributed around the pipe. The majority of the ribs each have a width in the circumferential direction that is less than the distance in the circumferential direction from one rib to the next. The pipe is subjected to a further deformation step in order to force the flanks of each rib into contact with each other using a tool assembly that includes radially movable sectors or a bushing that supports a plurality of radial rollers.

5 Claims, 11 Drawing Sheets

(56) References Cited

U.S. PATENT DOCUMENTS

| | | | | |
|---|---|---|---|---|
| 3,487,673 | A | * | 1/1970 | House .................... B21D 15/02 |
| | | | | 72/468 |
| 3,744,290 | A | | 7/1973 | Sirois |
| 4,154,082 | A | | 5/1979 | Beech |
| 7,007,362 | B2 | * | 3/2006 | Gibson .................... F16C 3/03 |
| | | | | 72/56 |
| 2004/0226334 | A1 | | 11/2004 | Zifferer |

\* cited by examiner

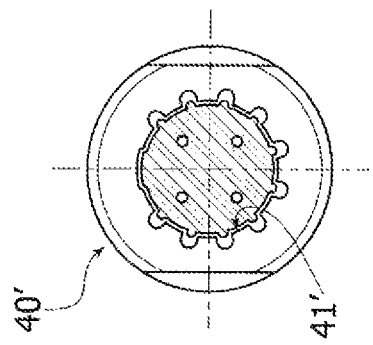
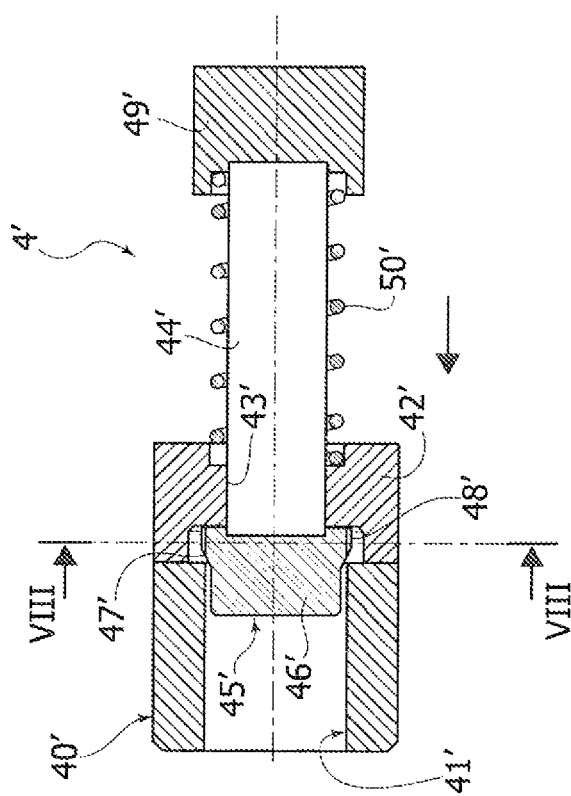
FIG. 8
FIG. 7

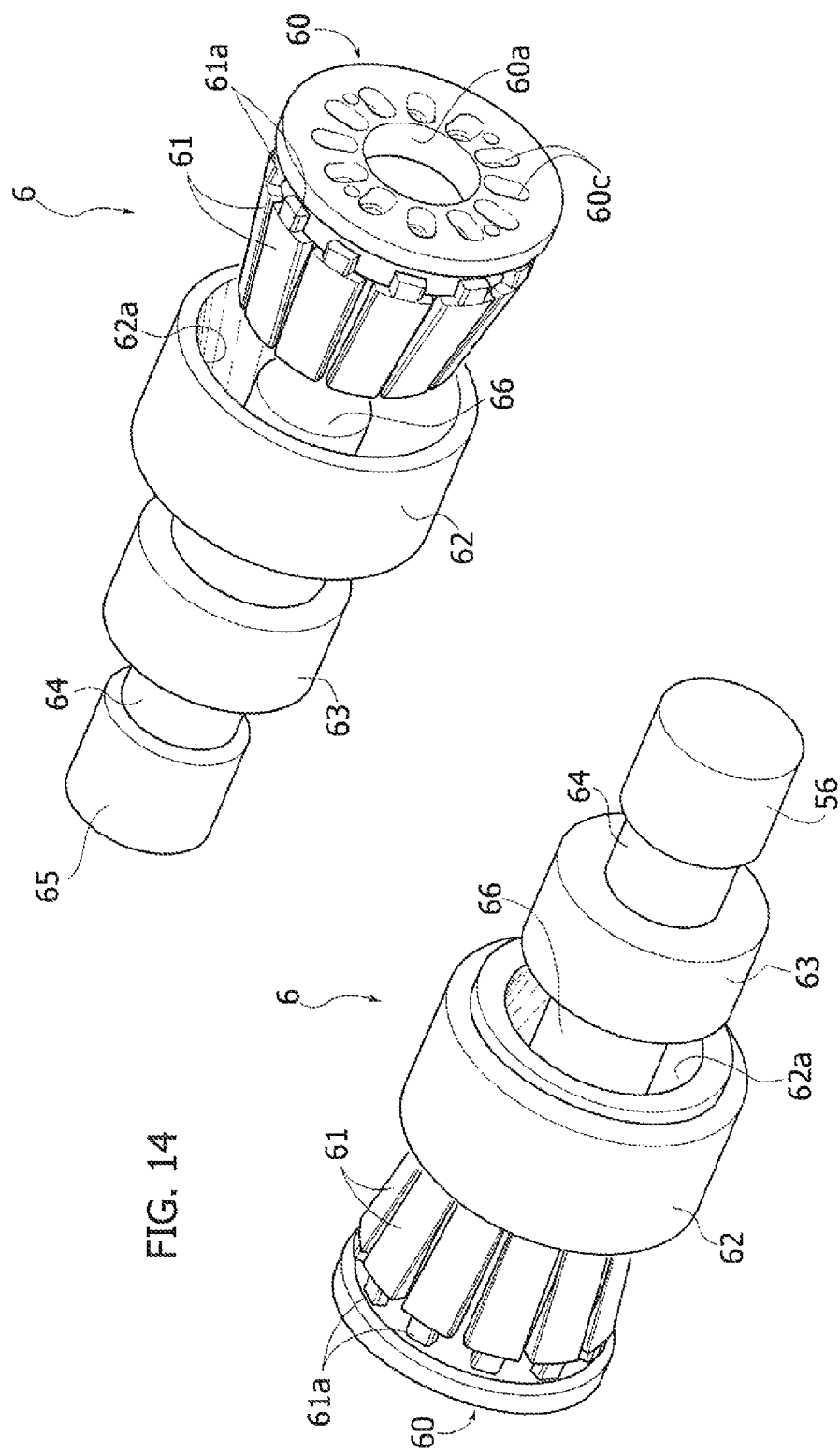

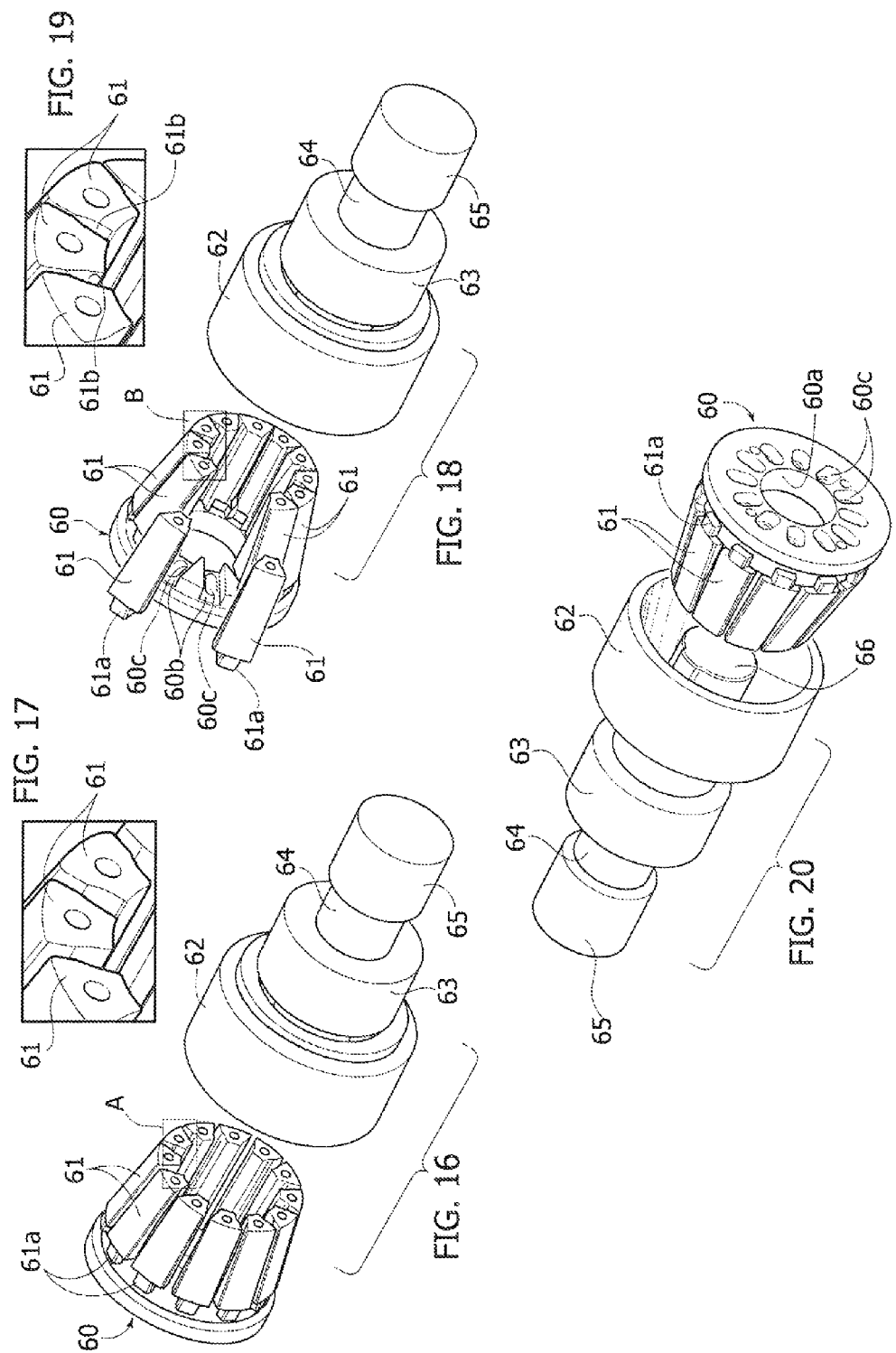

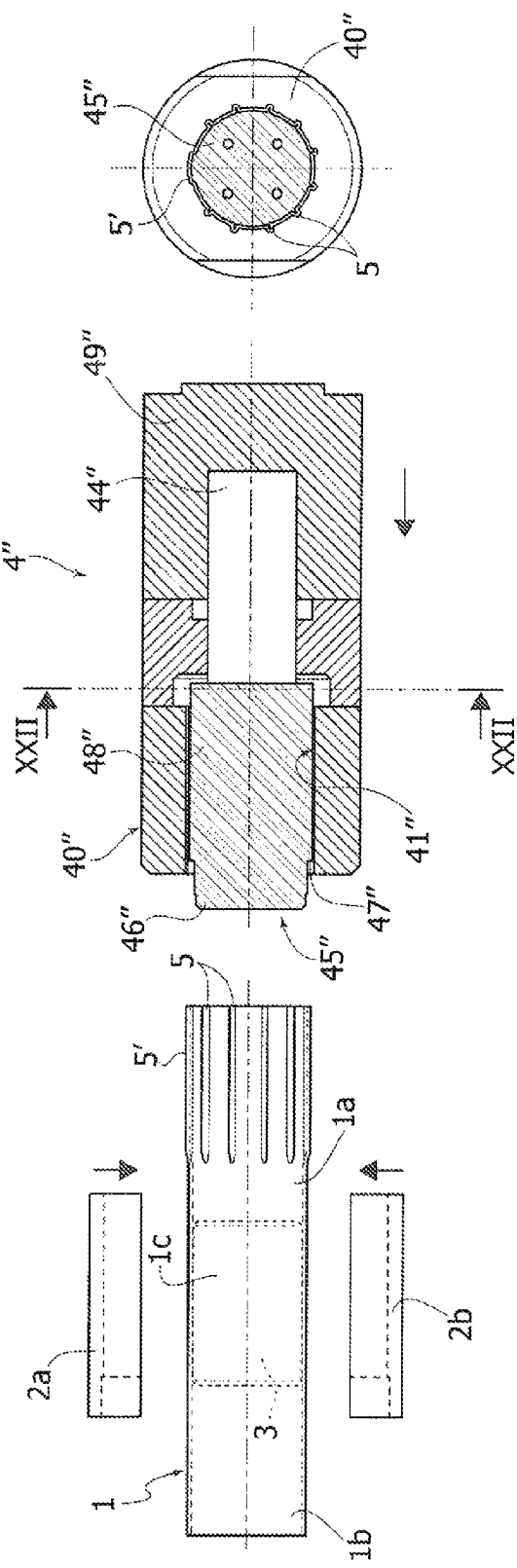

METHOD AND APPARATUS FOR FABRICATING A METAL PIPE HAVING AT LEAST ONE SMOOTH PORTION AND AT LEAST ONE GROOVED PORTION

BACKGROUND AND SUMMARY

The present invention refers to methods in the fabrication of metal pipes and concerns in particular a method for the fabrication of a metal pipe having a wall with at least one smooth portion and at least one grooved portion.

Methods are already known (see, for example, the documents U.S. Pat. No. 629,245, U.S. Pat. No. 3,487,673 and U.S. Pat. No. 3,744,290) for the fabrication of a metal pipe with a grooved portion, in which the grooved portion is obtained from, an initially smooth portion by means of progressive deformation of the wall of the smooth portion in at least two consecutive phases, where each phase is performed with the help of a tool assembly including a grooved female die, designed to receive the portion of pipe being deformed, and a grooved male punch, axially movable within the aforesaid portion of pipe and defining a plurality of longitudinal ribs distributed around the pipe in positions that are circumferentially spaced apart from each other.

The known methods, however, have the drawback of not enabling the production of a pipe structure having an elevated resistance to deformation, both flexural and torsional, and at the same time a relatively reduced weight.

The purpose of the present invention is to realize a method of the above specified type that is able to overcome the drawbacks of the known solutions and in particular guarantees the production of a pipe having optimal characteristics.

A further purpose is to realize a method that can be implemented with simple equipment and at relatively reduced cost, and with quick and easy steps, enabling an increased productivity.

In order to accomplish the aforesaid purpose, the method according to the invention has all the characteristics that were indicated in the beginning of the present specification and furthermore is characterized by the fact that the majority of the aforesaid ribs formed by means of the aforesaid progressive deformation of the initially smooth portion of pipe each have a width in the circumferential direction that is significantly smaller than the distance in the circumferential direction from one rib to another and by the fact that subsequently to the said progressive deformation of the said portion of pipe, the latter is subjected to a further operation of deformation in order to press into contact with each other the flanks of each rib, at least for the greater portion of said ribs.

Thanks to this characteristic, the method according to the invention guarantees the production of a structure having the desired resistance, without detriment to the characteristics of lightness and in particular without requiring the use of a pipe of elevated thickness, which brings obvious advantages also from the standpoint of manufacturing cost.

According to another preferred characteristic, both at the end of said progressive deformation of said portion of pipe (1a), and alter said further deformation step to press into contact with each other the flanks of each rib, the wall of the pipe maintains a cylindrical shape between one rib and another.

Further preferred characteristics of the present invention are indicated in the appended claims, which are an integral part of the teaching provided herein.

BRIEF DESCRIPTION OF THE DRAWINGS

Further characteristics and advantages of the invention will emerge from the following description, with respect to the appended drawings, provided merely as a nonlimiting example, where:

FIG. 7 is a lateral view of the apparatus used in a second phase of the method according to the invention, FIG. 8 is a sectional view along line VIII-VIII of FIG. 7, FIGS. 14, 15 are perspective views of the apparatus used in FIG. 13, shown in the exploded state, FIG. 16 is another exploded perspective view of the apparatus, with its sectors illustrated in an "open" condition, FIG. 17 illustrates detail A of FIG. 16 on magnified scale, FIG. 18 is another exploded perspective view of the apparatus, with some of the sectors illustrated in the removed state, to show the respective guide grooves, and with the remaining sectors illustrated in a "closed" condition, FIG. 19 illustrates detail B of FIG. 18 on magnified scale, and FIG. 20 is another perspective view of the apparatus with the sectors shown in the "closed" state, FIG. 21 is a schematic lateral view of the apparatus used in a fourth phase of the method according to the invention, FIG. 22 is a section along line XXII-XXII of FIG. 21.

DETAILED DESCRIPTION

Figure 1:
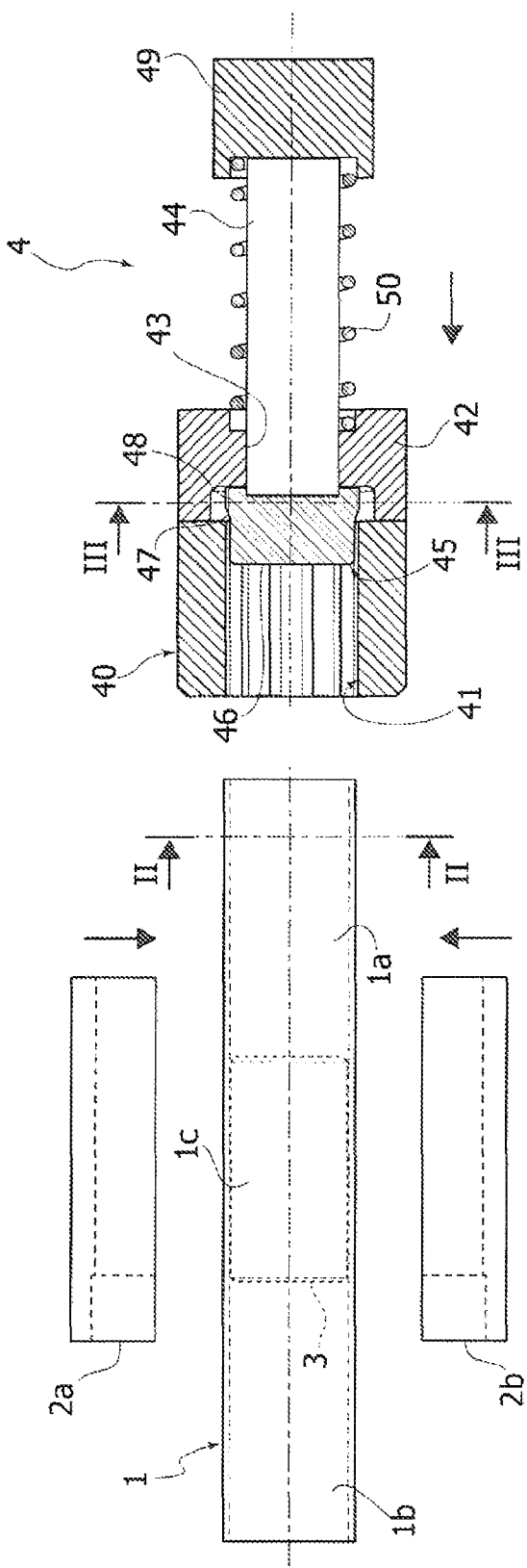
FIG. 1 is a schematic lateral view of an initially smooth pipe with the apparatus used to carry out the first phase of the process according to the invention.

With reference to FIG. 1, the left side of this figure shows a schematic lateral view of a pipe 1 intended to be subjected to the method of the invention. The pipe 1 is comprised of sheet metal and originally has a wall that is completely smooth. In one specific sample embodiment, the outer diameter of the pipe is originally 60 mm and the wall thickness of the pipe is 1.5 mm. In this specific sample embodiment, the material chosen for the pipe was Fe360.

The central part 1c of the pipe, which is meant to keep its original smooth shape, is locked between an upper jaw 2a and a lower jaw 2b, before an additional reinforcing pipe 3 is introduced into the pipe 1. The apparatus used to support and lock the upper and lower jaws 2a, 2b is not shown here, both for simplicity of drawing and because this can be implemented in any known manner.

The method according to the invention is described below with reference to the deformation of a first end portion 1a of the pipe 1, it being understood that the same method can then also be performed on the portion 1b located at the opposite end of the pipe.

Figure 4:
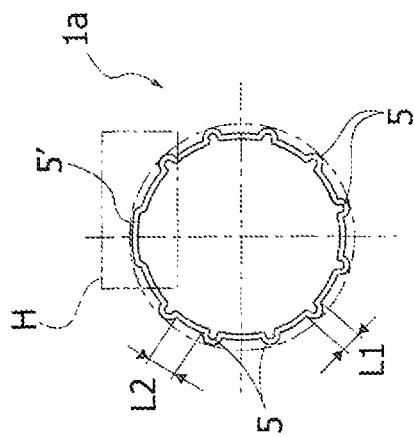
FIG. 4 is a cross sectional view of the portion of pipe having undergone the first phase of the method according to the invention.
Figure 5:
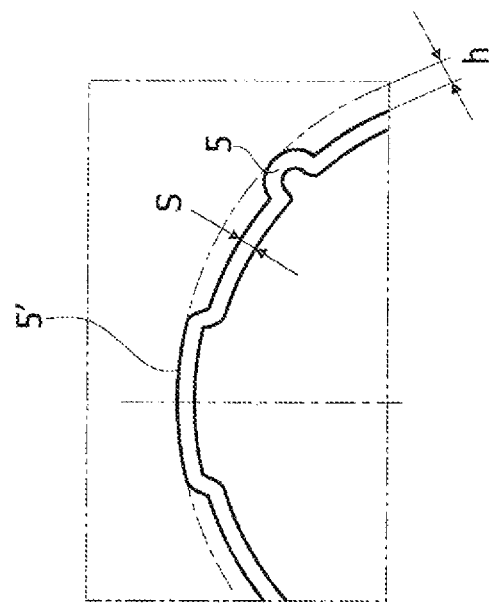
FIG. 5 is a magnified view of detail H of FIG. 4.

Once the internal pipe 3 has been inserted inside the central portion 1c of the pipe 1 and after the upper and lower jaws 2a, 2b have been closed so as to support the pipe 1 in fixed position, with the end portions 1a, 1b projecting axially to the outside of the jaws, the wall of the end portion 1a is deformed by means of a tool assembly 4 so as to give the wall of the end portion the undulating shape that is visible in FIG. 4 and in greater detail in FIG. 5. As can be seen, after the deformation, a plurality of longitudinal ribs 5 is defined in the wall of the pipe (better seen in FIG. 6), spaced apart at equal angular distances along the circumference of the pipe. With reference to FIGS. 4 and 5, one of the longitudinal ribs, indicated by 5', has a substantially increased width. This conformation, in the case of the example illustrated, is chosen to provide a reference for the angular position of the pipe when it is used in certain applications. However, it is obvious that this specific conformation refers to an example and that it would be entirely possible to have all the ribs 5 formed on the pipe identical to each other.

Figure 6:
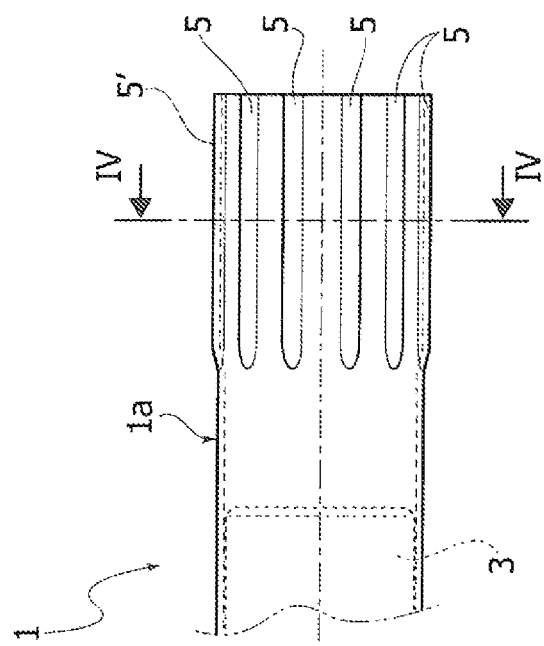
FIG. 6 is a lateral view on magnified scale of the pipe at the end of the first phase of the method, the section of FIG. 4 being taken along line IV-IV of FIG. 6.

As is evident from FIG. 4-6, one characteristic of the method according to the invention is that it forms ribs 5, each of which has a width in the circumferential direction that is substantially less than the distance in the circumferential direction between one rib and the next. In other words, with reference to FIG. 4, the distance indicated by L1 is substantially less than the distance indicated by L2.

The tool assembly 4 that is used to place the initially smooth wall of the pipe in the configuration illustrated in FIG. 4 comprises a female die 40 having a cylindrical receptacle 41 with grooved surface, having a profile corresponding to the desired profile for the pipe at the end of the first phase of the process. The cavity 41 is open at one end, designed to receive the portion 1a of the pipe inside it, while at the other end it is bounded by a wall 42 of the body of the die 40 having a central opening 43. Mounted inside the central opening 43 is a movable shaft 44, terminating in a punching head 45 which can move within the cavity 41 of the die 40. The head 45 has an end portion 46 of cylindrical shape, joined by a conical portion 47 to another portion 48, of larger diameter, having a grooved conformation with a profile corresponding to that of the internal surface of the deformed pipe portion to be obtained (see FIG. 3). The end of the shaft 44 opposite the head 45 is connected to a base body 49 designed to be operated by means of an actuator of any known type, such as a hydraulic actuator. Such an actuator is not shown here, both because it is not in itself part of the invention and as noted because it can be of any known type and finally because its omitting from the drawings makes them more simple and more immediately understandable. A helical spring 50 is placed between the body 49 and the body 40.

The first phase of the process according to the invention is therefore performed as follows.

After the central portion 1c has been locked between the jaws 2a, 2b, the tool assembly 4 is positioned above the end portion 1a of the pipe, which is received inside the cavity 41 of the die 40. In this phase, the head 45 makes contact with the wall 42, i.e., in the position illustrated in FIG. 1. The tool 4 is made to advance onto the portion of pipe 1a until the latter is inserted between the wall of the cavity 41 and the end portion 46 of the punching head 45, until it comes up against the conical portion 47. Said movement to the left (with reference to FIG. 1) of the tool assembly 4 is controlled by the actuator (not shown), which controls the base body 49 of the punch. Once the end surface of the pipe 1 has come up against the conical portion 47 of the punching head 45, the further movement to the left (with reference to FIG. 1) of the base body 49 controlled by the actuator results in a compression of the helical spring 50 and an advancing of the punching head 45 into the cavity 41 of the die and into the pipe 1. The conical portion 47 and the grooved portion 48 of the punching head dictate in the course of this axial movement a progressive deformation of the initially smooth wall of the pipe, so as to give it the conformation seen in FIG. 4-6.

In one particular sample embodiment of the method, after the first phase described above the deformed pipe so obtained has a wall with a thickness s (FIG. 5) of 1.45 millimeters, and ribs each of which has a width L1 (FIG. 4) equal to 6.3 millimeters, with a distance L2 between one rib and the next equal to 10.2 millimeters. Furthermore, again in this particular sample embodiment, the height "h" (FIG. 5) of each rib is equal to 2.4 millimeters. That is:

$$s=1.45; h=2.4; L1=6.3; L2=10.2.$$

After the first phase of the above-described process, a second phase is carried out, being identical in concept to the first phase but making use of a tool 4' constructed with dimensions slightly different from those of the tool 4 used in the first phase of the process, in order to obtain an increment of deformation of the pipe.

Figure 2:
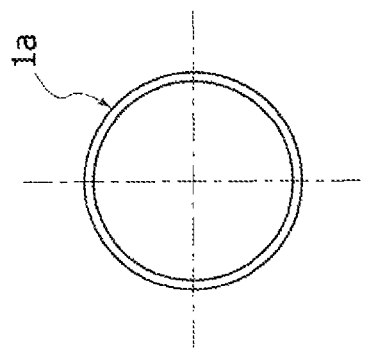
FIG. 2 is a cross section view along line II-II of the pipe, before carrying out the method.
Figure 3:
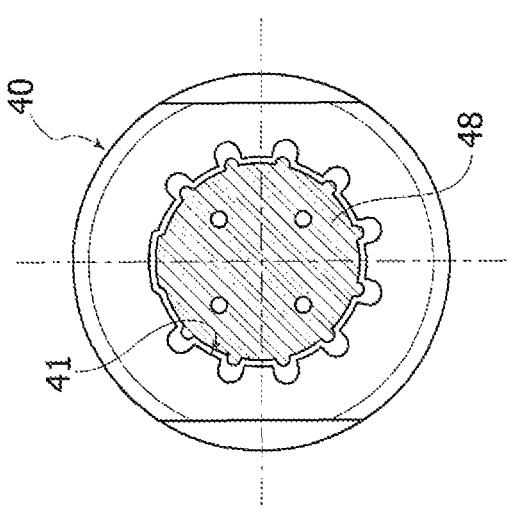
FIG. 3 is a sectional view along line III-III of the apparatus used in the first phase of the method.
Figure 9:
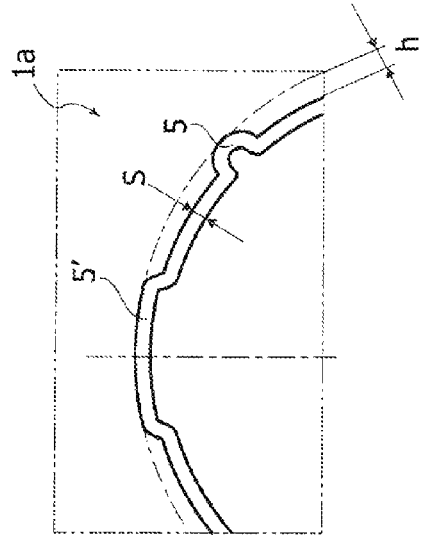
FIG. 9 is a sectional view of the deformed portion of the pipe at the end of the second phase of the method.
Figure 10:
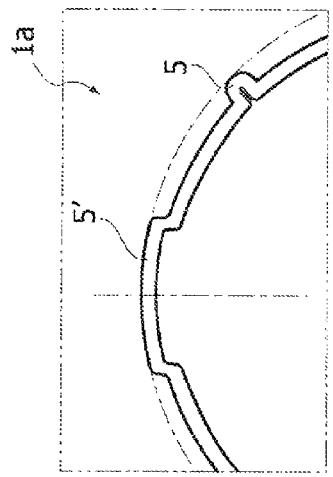
FIG. 10 is a magnified view of detail Q of FIG. 9.

In FIG. 7 and in FIG. 8, the parts corresponding to those of FIGS. 1 and 3 are indicated by the same reference numbers, except for the addition of a prime symbol. The tool illustrated in FIGS. 7 and 8 is not described here once again, since it is qualitatively identical to that of FIGS. 1 and 2. As noted, the conformation and the dimensions of the various elements and in particular those of the cavity 41' and the punching head 45' are different, so as to obtain an increment in the deformation of the wall. With reference to FIGS. 9 and 10, which show the wall of the portion of pipe 1a at the end of the second phase of the process, in one specific sample embodiment the final thickness s of the wall, the height h of each rib 5, the width L1 of each rib 5 and the distance L2 between two adjacent ribs have the following values:

$$s=1.43; h=3.6\ L1=5.0\ L2=11.5.$$

As can be seen by comparing these dimensions with those of the pipe at the end of the first phase of the process, the second phase of the process increases the height of the ribs and decreases their width by also increasing the distance between the ribs and decreasing the thickness.

Figure 24:
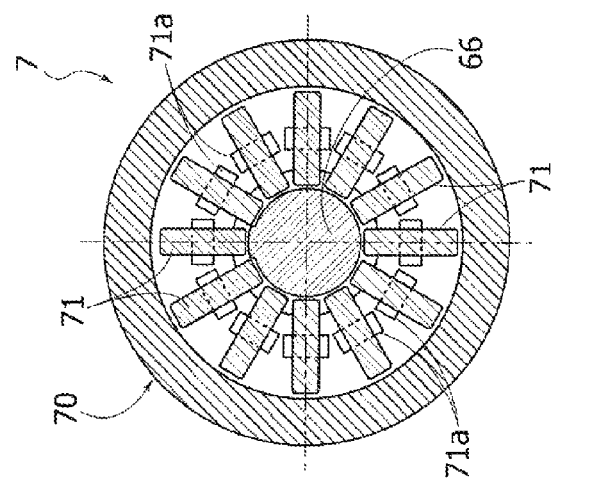
FIG. 24 is a sectional view along line XXIII-XXIII of FIG. 23.
Figure 23:
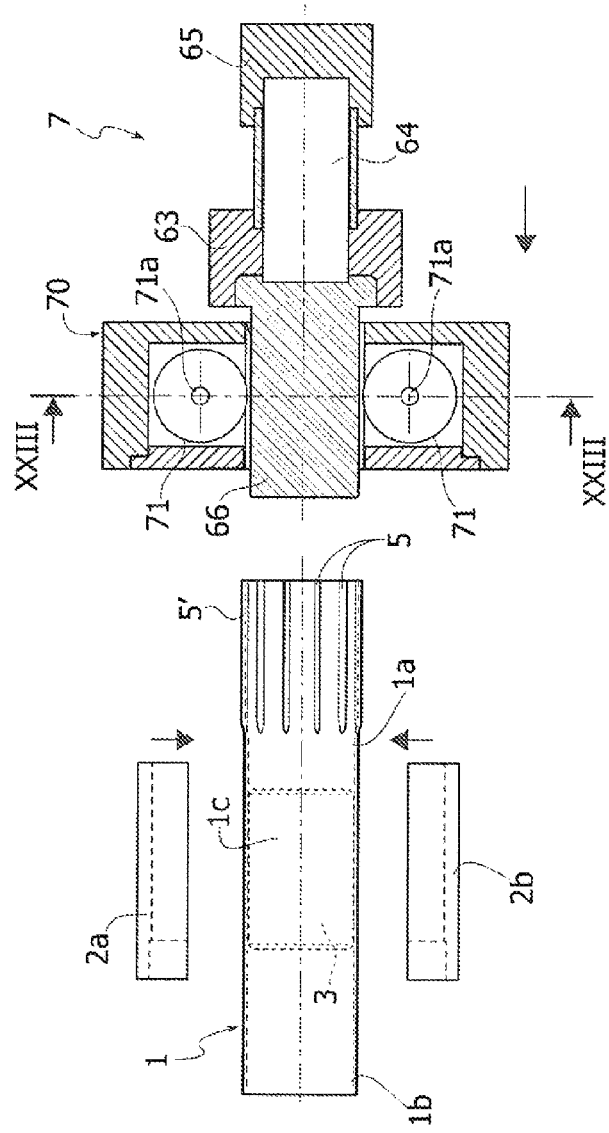
FIG. 23 is a schematic lateral view of a second embodiment of the apparatus used in the third phase of the method according to the invention.
Figure 25:
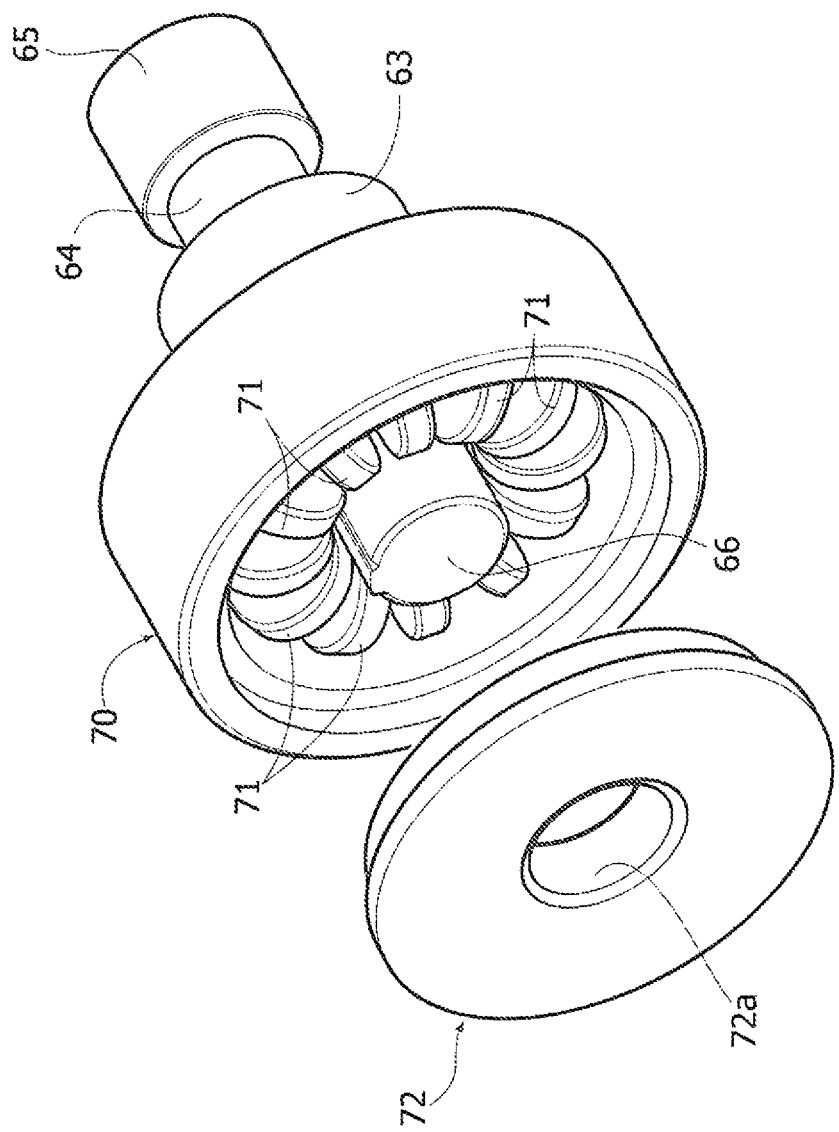
FIG. 25 is an exploded perspective view of the apparatus of FIG. 22, 23.

Once the stage of deformation as illustrated in FIGS. 9 and 10 has been reached, a third phase of the process according to the invention is carried out with the help of the apparatus illustrated in FIG. 13-20, or alternatively, as shall be seen, with the help of the apparatus illustrated in FIG. 23-25.

Figure 11:
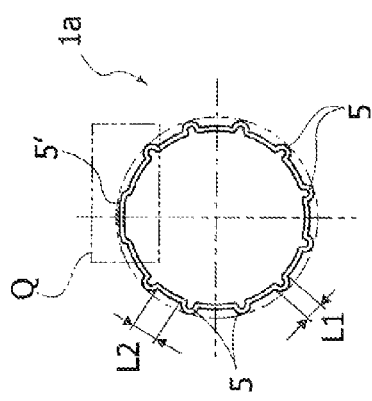
FIG. 11 is a sectional view of the deformed portion of the pipe at the end of a third phase of the method according to the invention.
Figure 12:
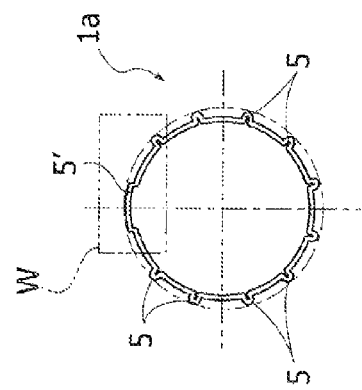
FIG. 12 is a magnified view of detail W of FIG. 11.
Figure 13:
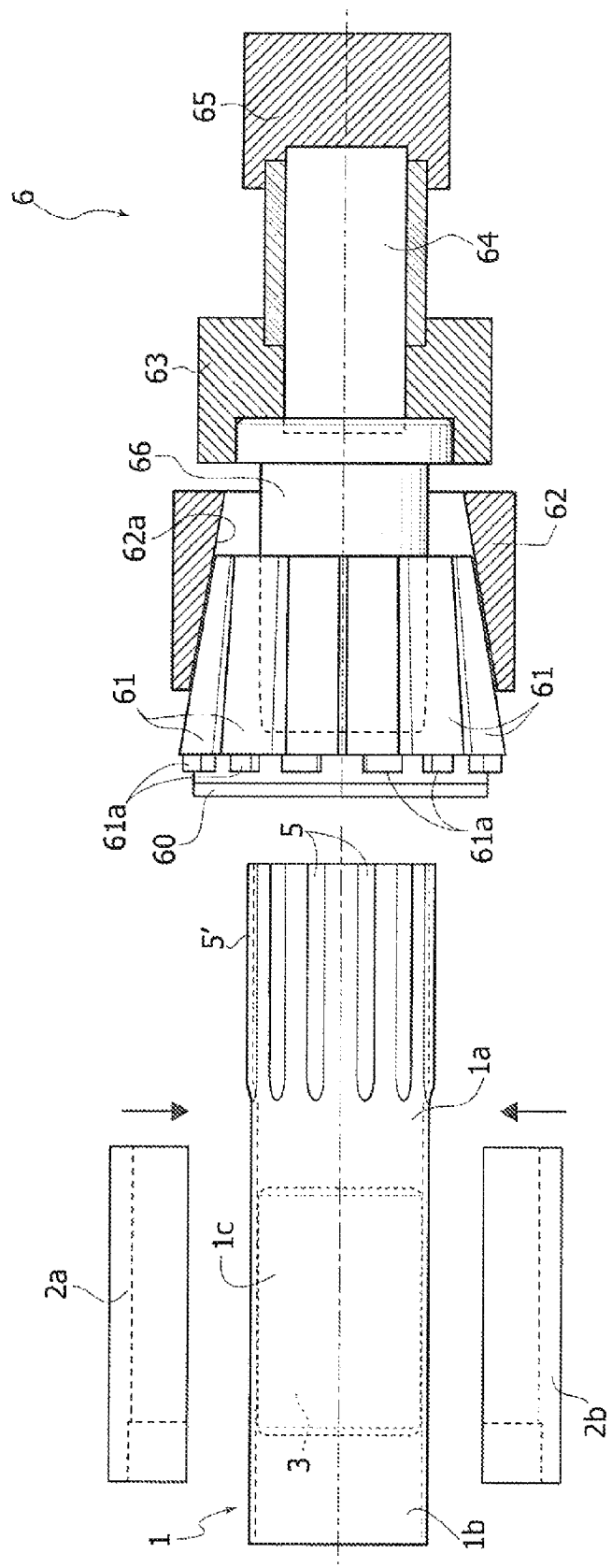
FIG. 13 is a lateral schematic view of the apparatus used in the third phase of the method according to the invention.

FIGS. 11 and 12 of the appended drawings show the configuration of the portion 1a of the pipe at the end of said third phase of the process. As is seen, this phase achieves a squeezing of the two flanks of each rib 5, making contact one against the other.

With reference to FIG. 13-20, the number 6 indicates a first embodiment of the apparatus used to carry out the third phase of the method according to the invention. The apparatus 6 comprises a ring 60 (FIG. 15) with a central opening 60a designed to accommodate the portion of pipe being deformed. The ring 60 has a front lace (visible in FIG. 15) turned toward the pipe, and an opposite face, visible in FIG. 18, having a plurality of radial grooves 60b. Mounted inside the radial grooves 60b (FIG. 18) of the disk 60 are movable stems 61a of a plurality of sectors 61 that project axially from the rear face of the ring 60. As shown in FIG. 16-19, the sectors 61 have an essentially trapezoidal shape in cross section and an axially elongated prismatic body. The sectors 61 are movable, in the manner to be described below, between an open configuration (visible in FIG. 16,17) where they are in their outermost radial position, and a closed configuration (visible in FIG. 18-20) where they are in their innermost radial position. Each sector 61 cannot emerge from the end of the respective groove 60b, inasmuch as its stem 61a has a projecting pin (not visible in the drawings) that is guided inside a radial slot 60c (see FIGS. 15 and 20). Again with reference to FIG. 13, the circumferential series of sectors 61 is accommodated within the internal conical surface 62a of a bushing 62. The bushing 62 can be pushed axially to the left (with reference to FIG. 13) relative to the group of sectors 61 carried by the ring 60 by means of a head 63 mounted at the end of a shaft 64 having a base body 65 designed to be operated by an actuator of any known type. At the start of the third phase of the method according to the invention, the group of sectors 63 is in the open configuration illustrated in FIG. 16, 17. The actuator is operated to control a movement to the left of the tool assembly 6. In this way, the assembly advances onto the end portion 1a of the pipe 1, which is thus inserted through the central opening 60a of the disk 60 and through the internal cavity defined by the sectors 61.

The shaft 64 of the tool assembly 6 has a front portion 66 that extends axially inside the cavity defined by the group of sectors 61. Therefore, when the tool group is made to advance onto the end portion 1a of the pipe, the latter is inserted around the shaft 66. The further advancement of the tool assembly brought about by the actuator results in contact between the head 63 and the bushing 62, which is thus forced to advance to the left, (with reference to FIG. 13) relative to the group of sectors 61. The axial advancement of the conical surface 62a onto the group of sectors 61 brings about the radial inward displacement of all the sectors 61, into their closed configuration, in which the space 61b (FIG. 19) defined between each pair of adjacent sectors 61 receives a corresponding rib 5 of the deformed pipe and causes its further deformation, pressing in circumferential direction the two flanks of each rib 5 until the make contact with each other in the configuration seen in FIG. 11, 12.

In this way, with the aforesaid third phase of the method according to the invention, one obtains a portion of pipe having a plurality of ribs 5 with elevated resistance to deformation.

FIG. 21 illustrates the apparatus used to carry out a fourth phase of the method according to the invention, in which the portion of pipe so deformed is further subjected to a slight deformation, by means of a tooling qualitatively identical to that of FIGS. 1 and 7, but having elements with different dimensions and shapes, so as to be adapted to the cross sectional profile obtained at the end of the third phase of the process and illustrated in FIG. 11, 12. In FIG. 21, the parts corresponding to those of FIGS. 1 and 7 are indicated by the same reference number, except for the addition of a double prime symbol. In this case, no spring is interposed between the die 40" and the base body 49", so that the die 40" and the base body 49" move together to bring the portion 1a of the pipe into the cavity 41" and around the punching head 45". The feed brought about by the operation of the actuator dictates in a single pass a finishing deformation of the wall of the pipe, which is done to definitively specify the geometry.

FIGS. 23-25 show a second embodiment of the apparatus used to perform the third phase of the method according to the invention. In this case, the tool assembly, indicated in its entirety by reference number 7, again comprises a front shaft 66 projecting from a head 63, in turn connected by a shaft 64 to a base body 65, which is controlled by an actuator of any known type (not illustrated). The front shaft 66 is placed centrally inside a bushing 70 which supports, in freely rotating manner, a plurality of rollers 71 disposed radially and free to rotate inside tangential axes 71a. The bushing 70 is closed at the front by a cover 72 (FIG. 25) with a central opening 72a. When the actuator is placed in operation, it brings about an advancement of the assembly 7 onto the portion of the pipe 1. In this way, the portion of the pipe is inserted through the opening 72a of the cover 72, around the shaft 66 and inside the row of rollers 71. In the course of the advancement of the tool assembly 7 onto the pipe, the rollers roll over the outer surface of the pipe, progressively deforming each rib 5 of the pipe so that at die end of the pass the flanks of each rib have been forced into contact against each other, in the space available between each pair of adjacent rollers 71, next to their zone of contact on the pipe.

Also in the event that the third phase of the method according to the invention is carried out with the apparatus 7 illustrated in FIG. 23-25, it is preferable to arrange at the end a last phase of adjustment by the use of the tooling illustrated in FIG. 21, 22.

As is obvious from the appended drawings, in the aforementioned preferred embodiments of the invention the wall of the pipe keeps a cylindrical conformation between one rib and the next, both at the end of the first two phases of progressive deformation of the wall of the pipe and after the further deformation step to press the flanks of each rib into contact with each other, and also after the last phase of the process.

Of course, given the principles of the invention, the design details and the embodiments can vary widely with respect to what has been described and illustrated merely as an example, without, thereby leaving the scope of the present invention.

The invention claimed is:

1. A method for forming a metal tube having at least one smooth portion and at least one fluted portion, wherein the fluted portion is obtained by the steps of:
   subjecting an initially smooth portion to a progressive deformation through at least two subsequent stages, wherein each stage is carried out using a tool unit including a fluted female die adapted for receiving therein the tube portion to be formed, and a fluted male mandrel that is axially movable within said tube portion, so as to provide the tube with a cross-section having an undulated profile, defining a plurality of longitudinal ridges distributed around the tube at positions circumferentially spaced from each other,
   wherein a plurality of the ridges formed by said progressive deformation of said tube portion each have a width in the circumferential direction which is substantially less than the distance along the circumferential direction between each pair of adjacent ridges, and wherein after said progressive deformation of said tube portion, the tube portion is subjected to a further deforming operation in order to press two sides of at least some of the ridges in contact against each other.

2. The method according to claim 1, wherein both at the end of said progressive deformation of said tube portion, and after said further deforming operation for pressing the two sides of at least some of the ridges in contact against each other, the wall of the tube is kept with its cylindrical configuration between each pair of adjacent ridges.

3. The method according to claim 1, wherein said further deforming operation for pressing the two sides of at least some of the ridges in contact against each other is carried out using a tool unit including a plurality of sectors radially slidably supported within radial slots formed on one face of a supporting ring, said sectors being arranged around said tube portion and being moved to a closed configuration in which they are at their innermost radial positions by axially moving thereon a bush having an inner conical surface in contact with the outer surfaces of said sectors.

4. The method according to claim 1, wherein said further deforming operation for pressing the two sides of at least some of the ridges in contact against each other is carried out using a tool unit comprising a cylindrical bush which freely rotatably supports a plurality of rollers arranged radially and freely rotatable each around a tangential axis, said tool unit also comprising a stem which is to be received within the tube portion, and said rollers being adapted to engage the outer surface of said tube portion as well as to deform it progressively during their rolling over the tube portion, by pressing the two sides within the gap between two adjacent rollers in proximity of the area of contact of these rollers with the outer surface of the tube portion.

5. The method according to claim 1, wherein after said further deforming operation, a subsequent deformation stage of the tube portion is carried out using a tool unit including a fluted female die and a fluted male mandrel, said die and said fluted mandrel being axially fixed relative to each other and being movable together on the outside and the inside, respectively, of the tube portion (1a) to cause a final deformation thereof into the desired configuration.

* * * * *